US012782628B2

(12) United States Patent
Michel

(10) Patent No.: US 12,782,628 B2
(45) Date of Patent: Nov. 3, 2026

(54) FIBER OPTIC ILLUMINATOR

(71) Applicant: mb-microtec ag, Niederwangen (CH)

(72) Inventor: Philipp Michel, Zollikofen (CH)

(73) Assignee: mb-microtec ag, Niederwangen (CH)

( * ) Notice: Subject to any disclaimer, the term of this patent is extended or adjusted under 35 U.S.C. 154(b) by 0 days.

(21) Appl. No.: 19/367,204

(22) Filed: Oct. 23, 2025

(65) Prior Publication Data

US 2026/0118570 A1 Apr. 30, 2026

Related U.S. Application Data

(60) Provisional application No. 63/711,520, filed on Oct. 24, 2024.

(51) Int. Cl.
*F21V 8/00* (2006.01)
*F41G 1/34* (2006.01)
*G02B 23/00* (2006.01)

(52) U.S. Cl.
CPC ........... *G02B 6/0006* (2013.01); *F41G 1/345* (2013.01); *G02B 23/00* (2013.01)

(58) Field of Classification Search
CPC ... F41G 1/345; F41G 1/35; F41G 1/34; F21V 8/00
See application file for complete search history.

(56) References Cited

U.S. PATENT DOCUMENTS 2,385,649 A 9/1945 Prideaux
5,653,034 A * 8/1997 Bindon ................ G02B 23/105 33/297
6,807,742 B2 * 10/2004 Schick ...................... F41G 1/34 33/297
2020/0326043 A1 10/2020 De Boer et al.

FOREIGN PATENT DOCUMENTS

CA 2686228 A1 12/2008
DE 1901846 U 10/1964
DE 202017104072 7/2017

OTHER PUBLICATIONS

International Search Report and Written Opinion of the International Searching Authority directed to International Patent Application No. PCT/IB2025/060816, mailed Feb. 16, 2026; 10 pages.

* cited by examiner

*Primary Examiner* — William J Carter
(74) *Attorney, Agent, or Firm* — Sterne, Kessler, Goldstein & Fox P.L.L.C.

(57) ABSTRACT

A fiber optic illuminator includes a light source and a fiber optic filament disposed around an exterior of the light source and positioned to receive light from the light source. A reflector is disposed around the light source and surrounds at least a portion of the fiber optic filament. An interior or exterior of the reflector is configured to reflect light emitted from the light source towards the fiber optic filament. A portion of the light from the light source and a portion of the reflected light are coupled into the fiber optic filament and exit an end of the fiber optic filament to form an alignment spot.

19 Claims, 12 Drawing Sheets

FIBER OPTIC ILLUMINATOR

CROSS-REFERENCE TO RELATED APPLICATIONS

The present application claims the benefit of U.S. Provisional Patent Application 63/711,520, filed on Oct. 24, 2024, which is incorporated herein by reference in its entirety.

FIELD

This disclosure relates to the field of fiber optic elements used to guide and produce lighting. For example, the fiber optic elements disclosed here can be used as part of an optical sighting device. In some embodiments, this disclosure is related to an insert for an optical sight that uses fiber optic filaments to form an optical aiming point.

BACKGROUND

Fiber optic filaments can be used to transmit light from a light source to a desired location. The light can be emitted from the end of the fiber optic element to provide illumination where desired. This can be useful in a wide range of applications, such as for illumination of control elements like buttons, illumination of display elements like gauges, or creating an illuminated point or area of light, which has a wide range of applications.

One such application are sights, which are used when a device needs to be oriented or aimed in a specific direction by a user. These devices can include handheld devices such as firearms or mounted devices such as survey equipment and astronomy equipment. The types of sights relevant to this disclosure are illuminated sights that use a light source to illuminate an aiming point displayed for a user. The user visually aligns the aiming point with the desired target. The sight is fixed to the device, which means that aligning the aiming point with the target aligns the device with the target.

Fiber optic filaments are often used in sights to transfer the light emitted from the light source to a position visible to a user as the aiming point. In some instances, the light source can be a non-electric light source, while in other instances the light source can be an electric light source, such as an LED light source. In most situations, these light sources tend to be relatively low intensity because the size of the light source needs to be minimized to keep the overall dimensions and weight of the sight small. This is especially relevant for sights used for handheld equipment like firearms.

Presently, the transfer of light from the light source into and through the fiber optic filament results in substantial loss of light intensity. When coupled with the relatively low output of the light sources used, this means that the aiming point can be dim, which can result in difficulty using the aiming point because it is hard to visually distinguish a dim aiming point. Thus, there exists a need to improve the intensity of light used for aiming points in these types of sights.

BRIEF SUMMARY

In an embodiment, a gun sight includes a mount configured to attach the gun sight to a gun and a light source coupled to the mount. One or more fiber optic filaments are disposed around an exterior of the light source and disposed to receive light from the light source, and at least a portion of the light from the light source is coupled into the fiber optic filament and exits an end of the fiber optic filament to form an alignment spot.

In a further embodiment, a reflector is disposed around the light source, the reflector surrounding at least a portion of the fiber optic filament, an interior or exterior of the reflector being configured to reflect light emitted from the light source towards the fiber optic filament. A portion of the reflected light is coupled into the fiber optic filament and exits an end of the fiber optic filament to form the alignment spot.

In a further embodiment the fiber optic filament forms a plurality of loops around the exterior of the light source, an axis of each of the loops being oriented at an angle non-parallel to an axis of the light source.

In a further embodiment the fiber optic filament forms a helix comprising a plurality of loops of the fiber optic filament around the exterior of the light source, an axis of the helix being oriented parallel to an axis of the light source.

In a further embodiment the reflector fully surrounds the light source such that all of the light emitted by the light source is reflected by the interior or exterior of the reflector.

In a further embodiment the gun sight includes a lens disposed to receive light emitted from the end of the fiber optic filament, the lens configured to direct the light emitted at the alignment spot.

In a further embodiment gun sight includes a housing, the light source being disposed in the housing. The housing includes either a transparent portion configured to allow light from the light source to pass through the housing or an opening positioned to allow light from the light source to pass through the housing. The fiber optic filament is disposed around an exterior of the housing.

In a further embodiment the housing includes a mounting tab extending from the housing, the mounting tab configured to be received in the gun sight to secure the housing in the gun sight.

In a further embodiment the gun sight includes a light output adjuster connected to the light source, the light output adjuster configured to move the light source with respect to the fiber optic filament to change the amount of light emitted from the light source being received by the fiber optic filament.

In a further embodiment the light output adjuster includes an actuator linked to a light source holder disposed in the housing, the actuator being configured to move the light source holder with respect to the fiber optic filament. The light source is fixed to the light source holder.

In a further embodiment the light source is not electrically powered.

In an embodiment, a fiber optic illuminator includes a light source and a fiber optic filament disposed around an exterior of the light source and positioned to receive light from the light source. A portion of the light from the light source is coupled into the fiber optic filament and exits an end of the fiber optic filament to form an alignment spot. In a further embodiment a reflector is disposed around the light source, the reflector surrounding at least a portion of the fiber optic filament. An interior or exterior of the reflector is configured to reflect light emitted from the light source towards the fiber optic filament. A portion of the reflected light is coupled into the fiber optic filament and exits the end of the fiber optic filament to form the alignment spot.

In a further embodiment a lens is disposed to receive light emitted from the end of the fiber optic filament, the lens configured to direct the light emitted at the alignment spot.

In a further embodiment the fiber optic filament forms a plurality of loops around the exterior of the light source, an axis of each of the loops being oriented at a non-parallel angle to an axis of the light source.

In a further embodiment the fiber optic filament forms a helix comprising a plurality of loops around the exterior of the light source, an axis of the helix being oriented parallel to an axis of the light source.

In a further embodiment the reflector fully surrounds the light source such that all of the light emitted by the light source is reflected by the interior or exterior of the reflector.

In a further embodiment the illuminator includes a housing that is configured to be inserted into a gun sight, the light source disposed inside the housing.

In a further embodiment the housing comprises a mounting tab extending from the housing, the mounting tab configured to be received in the gun sight to secure the housing in the gun sight.

In a further embodiment the illuminator includes a light output adjuster connected to the light source, the light output adjuster being configured to move the light source with respect to the fiber optic filament to change the amount of light emitted from the light source being received by the fiber optic filament.

In a further embodiment the light output adjuster includes an actuator linked to a light source holder disposed in the housing, the actuator configured to move the light source holder with respect to the fiber optic filament, wherein the light source is fixed to the light source holder.

In a further embodiment the light source is not electrically powered.

In a further embodiment the light source is formed with a cylindrical shape, and wherein the axis of each of the plurality of loops of the fiber optic filament is parallel to an axis of the cylindrical shape of the light source.

In a further embodiment the illuminator includes a mount configured to secure the illuminator to a device.

BRIEF DESCRIPTION OF THE DRAWINGS/FIGURES

The accompanying drawings, which are incorporated herein and form a part of the specification, illustrate the present disclosure and, together with the description, further serve to explain the principles thereof and to enable a person skilled in the pertinent art to make and use the same.

In the drawings, like reference numbers generally indicate identical or similar elements.

DETAILED DESCRIPTION

Reference will now be made in detail to representative embodiments illustrated in the accompanying drawings. References to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such a feature, structure, or characteristic in connection with other embodiments whether or not explicitly described.

Systems and methods of the present disclosure address the issue of producing and directing light of suitable intensity using a fiber optic filament and a light source. The illuminators discussed here contain a light source. Multiple loops or passes of a fiber optic filament are arranged around the light source to absorb the light emitted from the light source. The fiber optic filament then transmits that light and emits it from an end of the fiber optic filament to form an aiming point. In some embodiments a reflector surrounds the light source and optical fiber filament and reflects light back to the fiber optic filament. In some embodiments a lens is positioned to receive the light emitted from an end of the fiber optic filament and focus that light to form the desired illumination. These embodiments, including embodiments that combine all three of these features, have the benefit of substantially increasing the amount of light captured from the light source and used to form the illumination required. Other benefits of the present disclosure are discussed below.

The discussion below focuses on embodiments of illuminators used in optical sight devices to form an aiming point. However, the illuminators discussed here can be used in any application where focused illumination is desirable. For example, illumination of user controls, such as buttons or knobs, can be accomplished by using embodiments of the illuminator disclosed here. Other applications include illumination of display elements such as gauges and indicators. The benefits discussed above and below apply equally to these applications.

Figure 1:
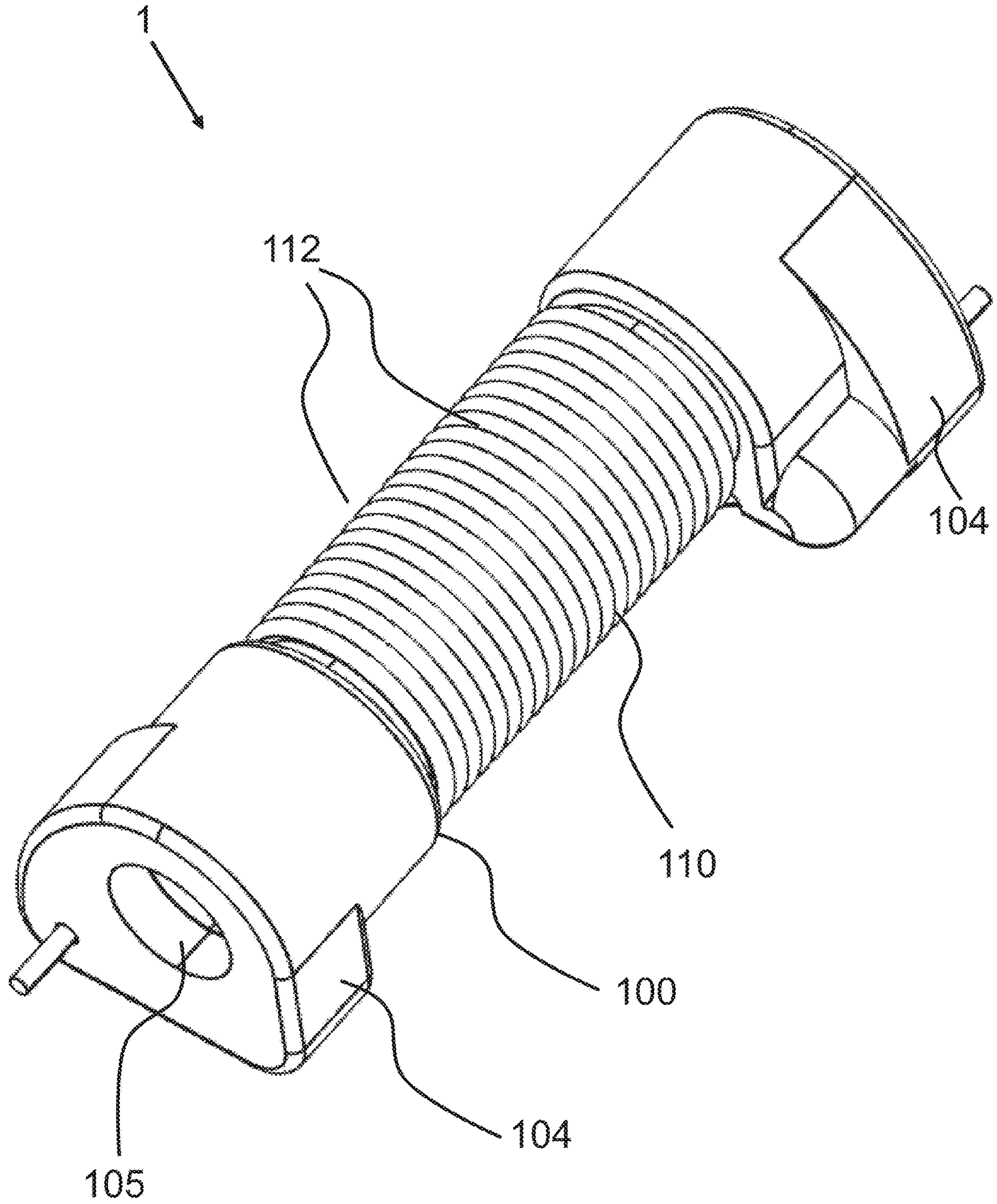
FIG. 1 is a perspective view of an illuminator, according to an embodiment.
Figure 2:
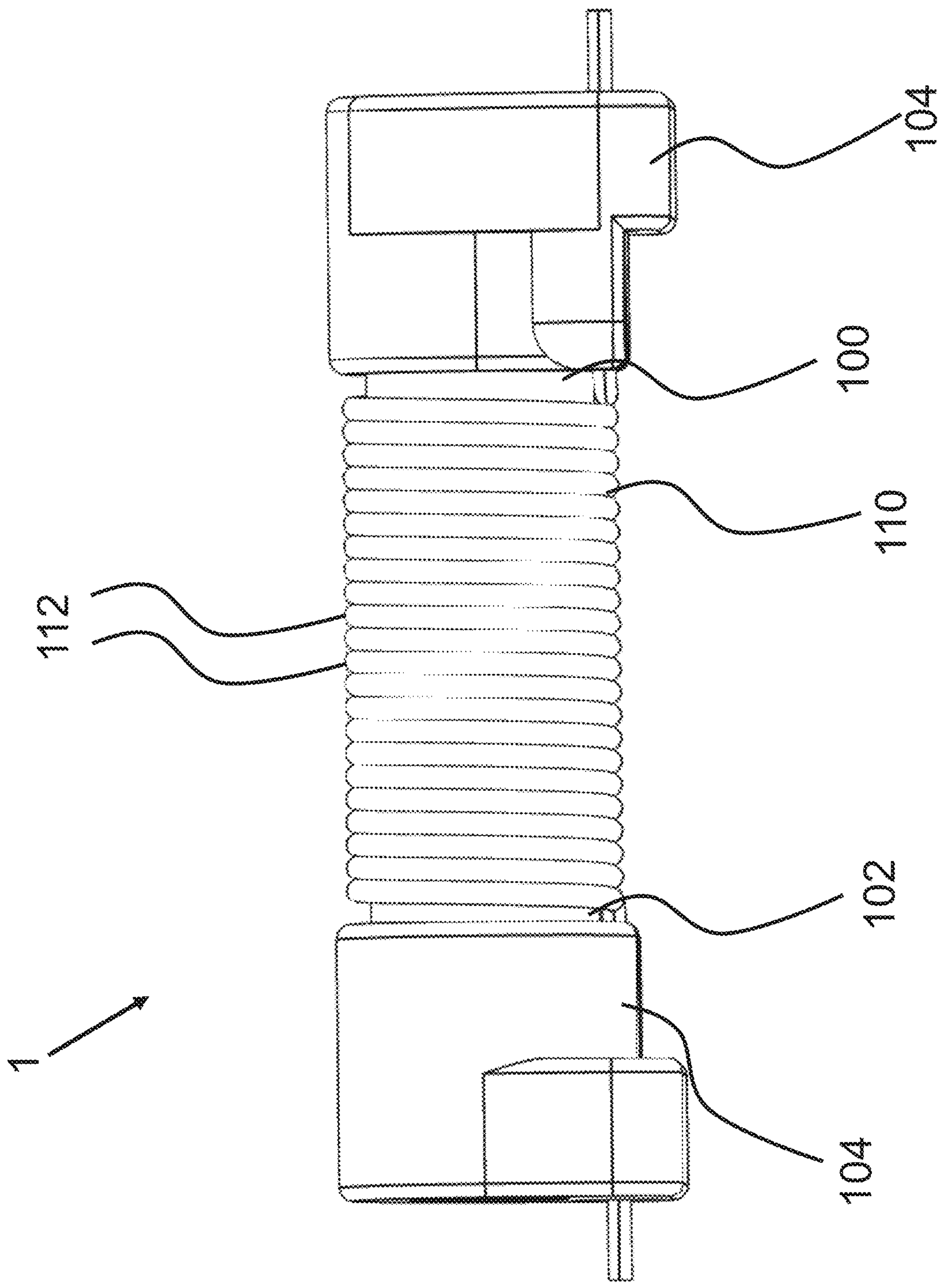
FIG. 2 is a side view of the illuminator of FIG. 1, according to an embodiment.
Figure 3:
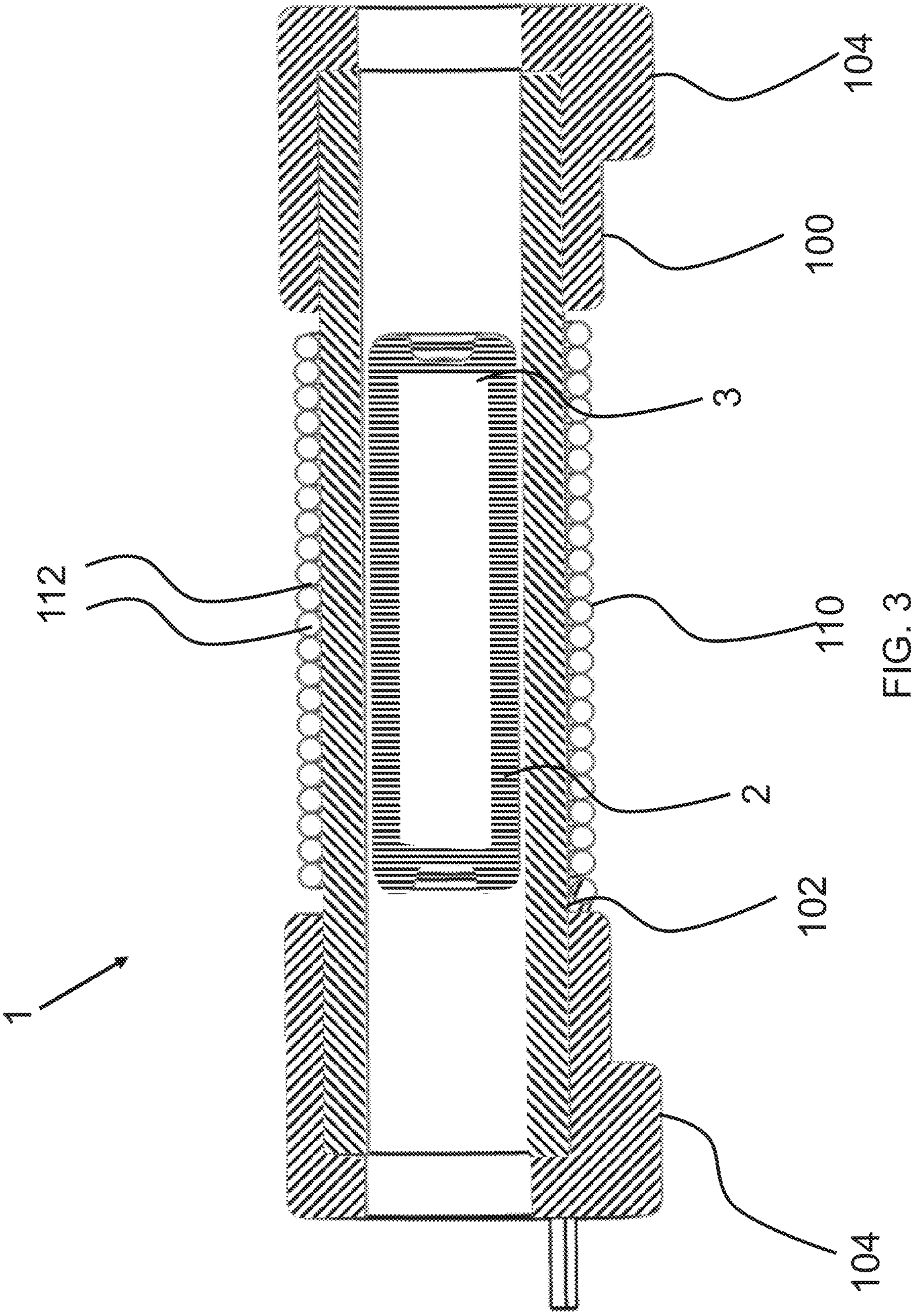
FIG. 3 is a cross section view of the illuminator of FIG. 1, according to an embodiment.

As shown in FIGS. 1-3, an embodiment of an illuminator 1 is formed from a housing 100 that contains a light source 2 in an interior of housing 100. Housing 100 is configured to allow light from light source to pass from the interior of housing 100 to an exterior of housing 100. In some embodiments, there may be one or more openings in housing 100 that allow the light to pass through from the interior to the exterior. In other embodiments housing 100 may be formed at least partially or completely from a transparent material that is selected to pass light emitted from light source 2 from the interior of housing 100 to an exterior of housing 100 with minimal or no absorption of light by housing 100. In these and similar embodiments housing 100 is configured to securely hold light source 2 in the interior through any suitable techniques, such as can mechanical elements like protrusions or snap fit features and/or adhesives. Housing 100 can be constructed from any suitable material, including plastic, metal, composite materials, and glass. Notably, the materials of housing 100 can be selected to be both shock and temperature resistant to ensure durability and suitable performance of illuminator 1, as would become apparent to persons skilled in the art.

In some embodiments light source 2 is formed as a gaseous tritium light source 3. This means that light source 2 is formed as an at least partially transparent container (e.g., a glass container) that contains gaseous tritium that is configured to generate illumination of a zinc sulfide layer inside the transparent container. This illumination passes through the container of light source 2 and is thus visible from the exterior of light source 2. Additional details regarding gaseous tritium light source 3 can be found in U.S. Pat. No. 10,386,158, which is incorporated herein by reference in its entirety. In other embodiments, light source 2 can be formed from or coated with other self-illuminating materials, such as photoluminescent or phosphorescent paints. In further embodiments, light source 2 can be a self-contained powered light source. For example, light source 2 can be a self-contained device having a light source, such as a light emitting diode, and a power source to power the light source, such as a battery.

In this embodiment, a fiber optic filament 110 is fixed around housing 100. Fiber optic filament 110 is a fiber optic filament configured for transmission of a desired wavelength of light. In some embodiments, fiber optic filament 110 can have a diameter between about 0.05 millimeters to 3 millimeters. The absorption wavelength of the light fiber has to be matched to that of the light emitted by light source 2. Fiber optic filament 110 is positioned around housing 100 in such a way as to maximize the area of fiber optic filament 110 that is exposed to the light from the light source. In this way, the amount of light transferred from light source 2 to fiber optic filament 110 is increased. In the embodiment of FIGS. 1-3, body 102 of housing 100 is formed in a cylindrical shape, with light source 2 positioned in the hollow center of body 102. Fiber optic filament 110 is formed in a series of loops 112 that are wrapped around the outer surface of body 102. Each loop 112 is placed in close contact with other loops 112 such that fiber optic filament 110 forms a helix wrap around body 102. In this embodiment, loops 112 are therefore oriented such that the axis of the resulting helix shape formed from loops 112 is approximately parallel to the axis of body 102, which is itself aligned with the axis of light source 2. There can be any number of loops 112 of fiber optic filament, and indeed in many embodiments the number of loops is maximized when taking into account spacing and manufacturing considerations. As seen in FIGS. 1 and 2, the closely spaced loops 112 allow a relatively large amount of fiber optic filament to be exposed to light from light source 2 through housing 100. This is desirable because, as explained above, size and weight are design concerns for many optical sights and thus reducing the size of housing 100 by maximizing light area of fiber optic filament 110 with respect to the size of housing 100 is beneficial. Fiber optic filaments 110 can be fixed to housing 100 in any suitable manner. For example, adhesives may be used to fix fiber optic filaments 110 in place. In some embodiments, housing 100 can have grooves, protrusions, or other features that aid in mechanically fixing fiber optic filaments 110 in place.

In some embodiments there can be more than one fiber optic filament 110. This can be useful to, for example, create an aiming point with different colors or different illuminated elements. That is to say, each fiber optic filament can be configured to form a different portion of the aiming point, and/or form a different color for the aiming point. Multiple fiber optic filaments 110 are incorporated in the same way discussed above for a single fiber optic filament 110.

In some embodiments, fiber optic filament 110 can be positioned and configured to absorb additional light from environmental sources, such as the sun or other light sources external or adjacent to the sight. In such situations, the environmental light can be absorbed by fiber optic filament 110 in addition to the light from light source 2 disposed inside housing 100. Housing 100 can be configured to optimize exposure of fiber optic filament 110 to both light source 2 and such external light (e.g., through a suitable transparent portion or opening in the sight).

Also shown in FIGS. 1-3, housing mounts 104 function to secure illuminator 1 into the relevant sight structure. Housing mounts 104 can vary in size, shape, placement, number and function depending on the specifics of the sight receiving illuminator 1. For example, in some embodiments, housing mounts 104 are configured as protrusions or tabs that cap the ends of body 102 of housing 100. The protrusions are shaped to be received in corresponding receptacles formed in the gun sight in a snap fit manner. As shown in FIGS. 2 and 3, housing mounts 104 can be shaped to allow passage of fiber optic filament 110 through housing mounts 104. Such an arrangement can aid in routing fiber optic filament 104 to the appropriate location in the sight for forming the aiming point. An access opening 105 can also be formed in each housing mount 104 to allow for installation and removal of light source 2.

Figure 4:
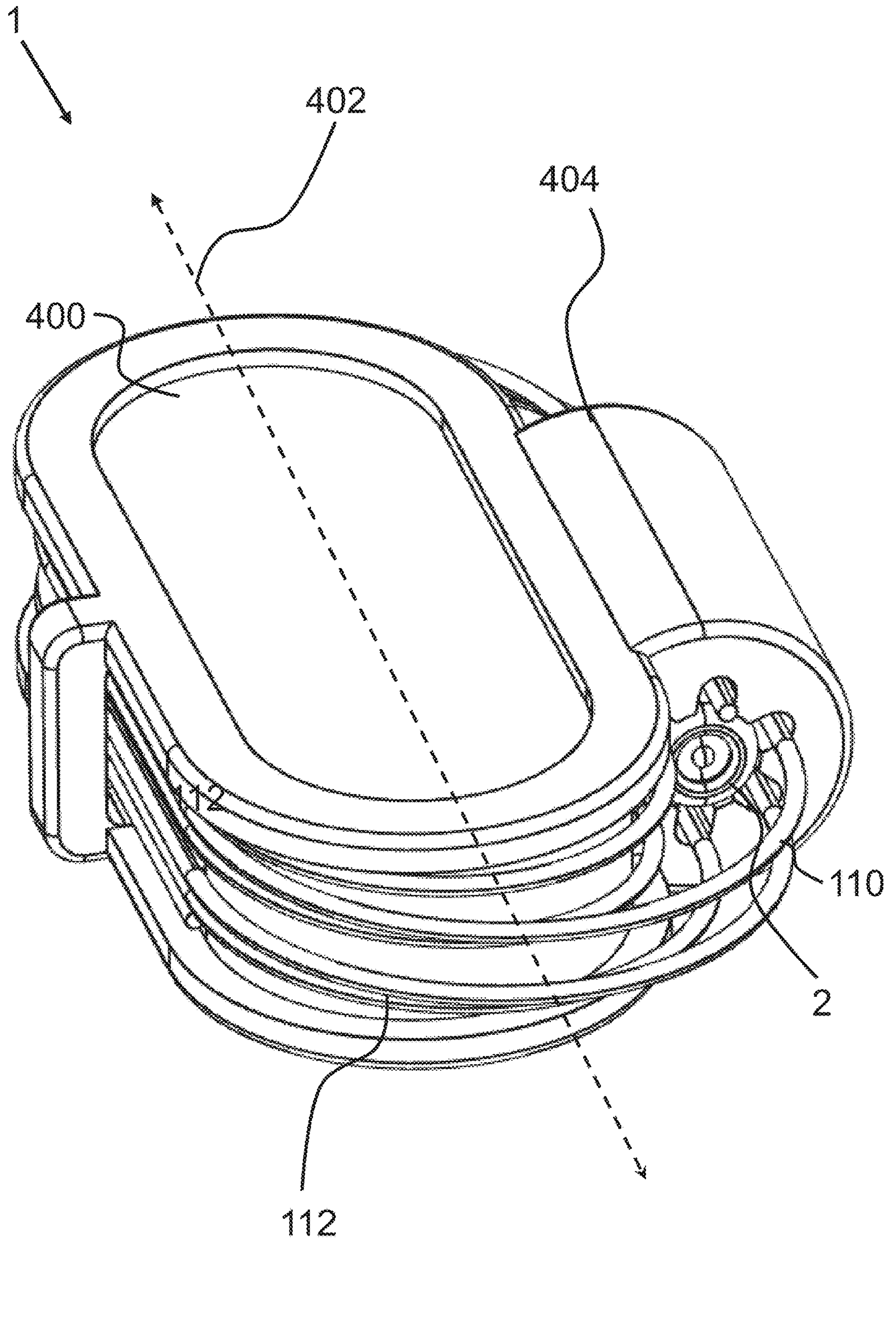
FIG. 4 is a perspective view of an illuminator, according to an embodiment.

FIG. 4 shows another embodiment of illuminator 1. In this embodiment, a housing 400 has a stadium-type cross section, which can also be described as a rectangular cross section with radii on the corners. This embodiment is similar to the embodiment above and also includes a light source 2 (visible inside a light source holder 404 of housing 400). Fiber optic filament 110 is routed around the perimeter of housing 100 to form loops 112, and each loop 112 has a portion that passes along light source 2 in light source holder 404. Thus, in this embodiment, there is no opening or transparent portion of housing 400 because fiber optic filament 110 is directly in contact with light source 2 (there is no portion of housing 400 interposed between these elements). Also seen in this embodiment are grooves formed in housing 400 to retain fiber optic filament 110. As in the above embodiment fiber optic filament 110 forms multiple loops 112 around housing 400. However, here the axes of the loops 112 are perpendicular to the long axis 402 of housing 400 (i.e., the dimension running parallel to the parallel sides of housing 400).

Figure 5:
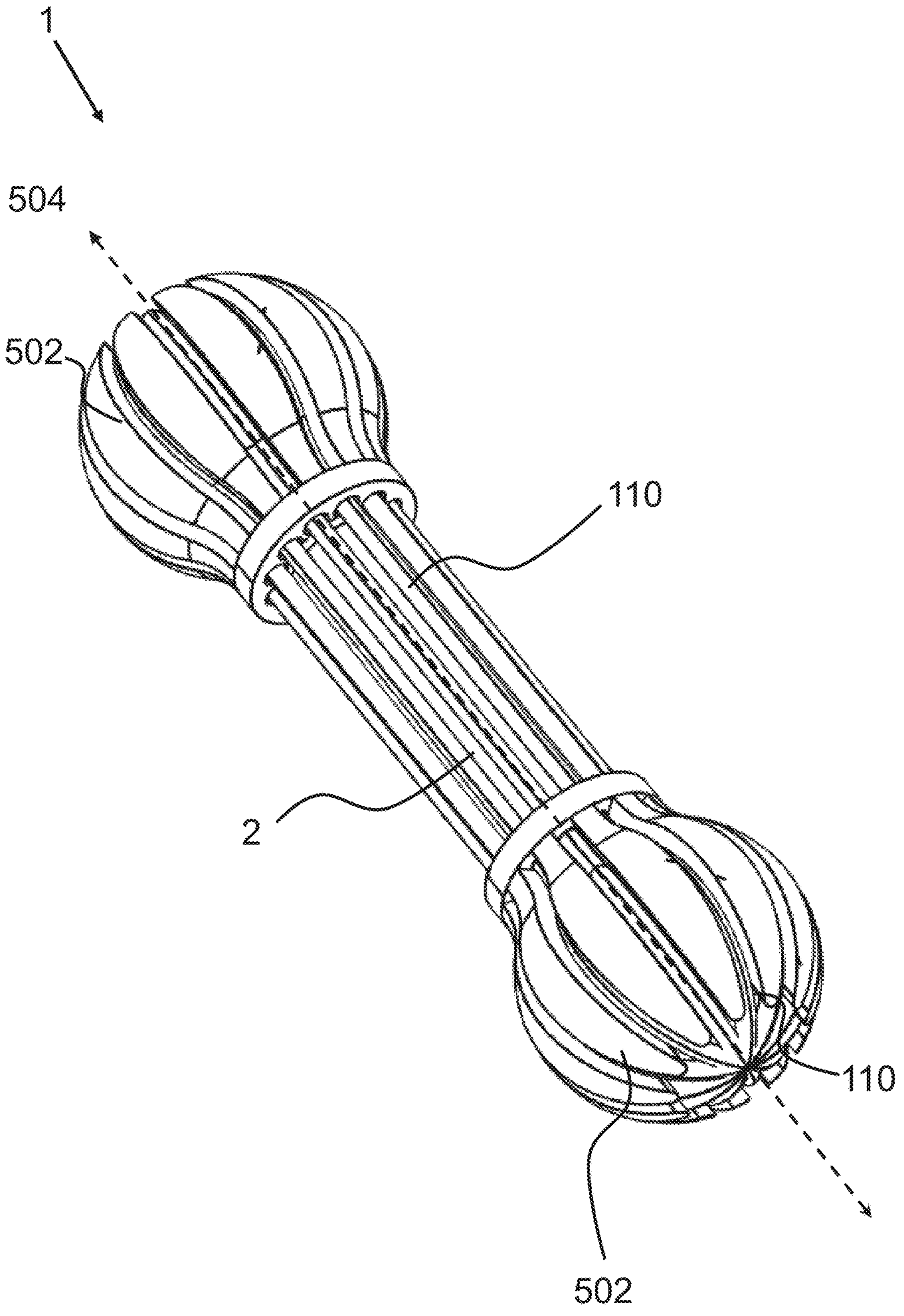
FIG. 5 is a perspective view of an illuminator, according to an embodiment.

FIG. 5 shows another embodiment of illuminator 1 that differs from the above embodiments in that light source 2 forms the main body of illuminator 1. Thus, there is no separate housing 100. The outer surface of light source 2 is in direct contact with fiber optic filaments 110. In this embodiment the ends of light source 2 are capped with spherical caps 502 that give illuminator 1 a dumbbell-type shape. Like the embodiment of FIG. 4, fiber optic filament 110 forms loops 112 that are oriented to run lengthwise along the exterior of illuminator 1. That is, the axes of loops 112 are not parallel to an axis 504 of illuminator 1. Put another way, the long sides of each of the loops 112 are parallel or near parallel to the long axis of light source 2. Also like the FIG. 4 embodiment, grooves are formed in the exterior of illuminator 1 (exterior of caps 502) to retain fiber optic filament 110.

Figure 6:
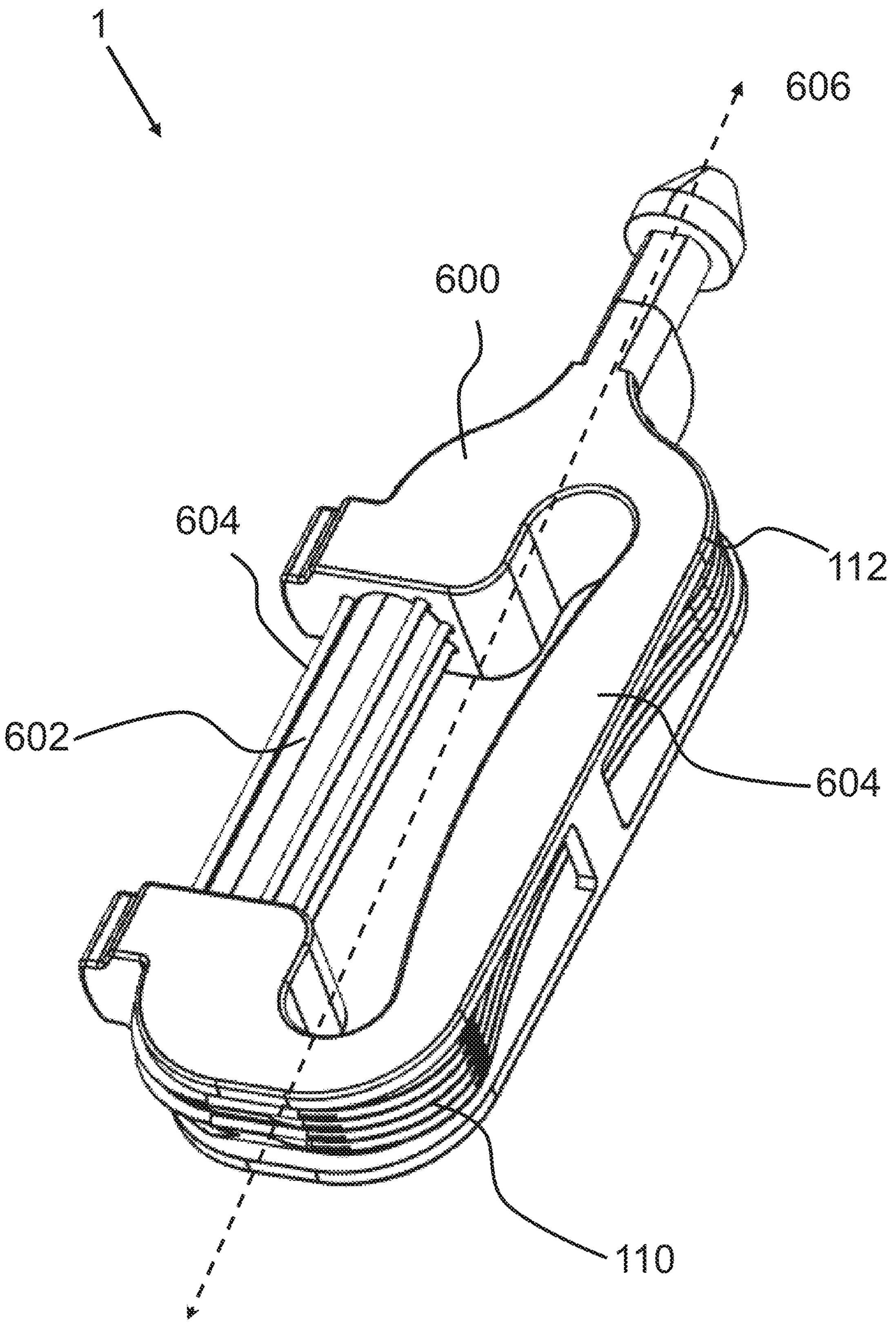
FIG. 6 is a perspective view of an illuminator, according to an embodiment.

FIG. 6 shows another embodiment of illuminator 1 that includes an approximately elliptical housing 600 with an open interior. In this embodiment light source 2 is located in a light source holder 602 that forms a portion of one of the longer sections 604 of housing 600. Fiber optic filament 110 forms loops 112 around the perimeter of housing 600, and as shown there are grooves formed in housing 600 to guide loops 112. The axes of loops 112 are also perpendicular to long axis 606 of housing 600 (and thus, the axis of light source 2), as in the embodiments of FIGS. 4 and 5.

Figure 7:
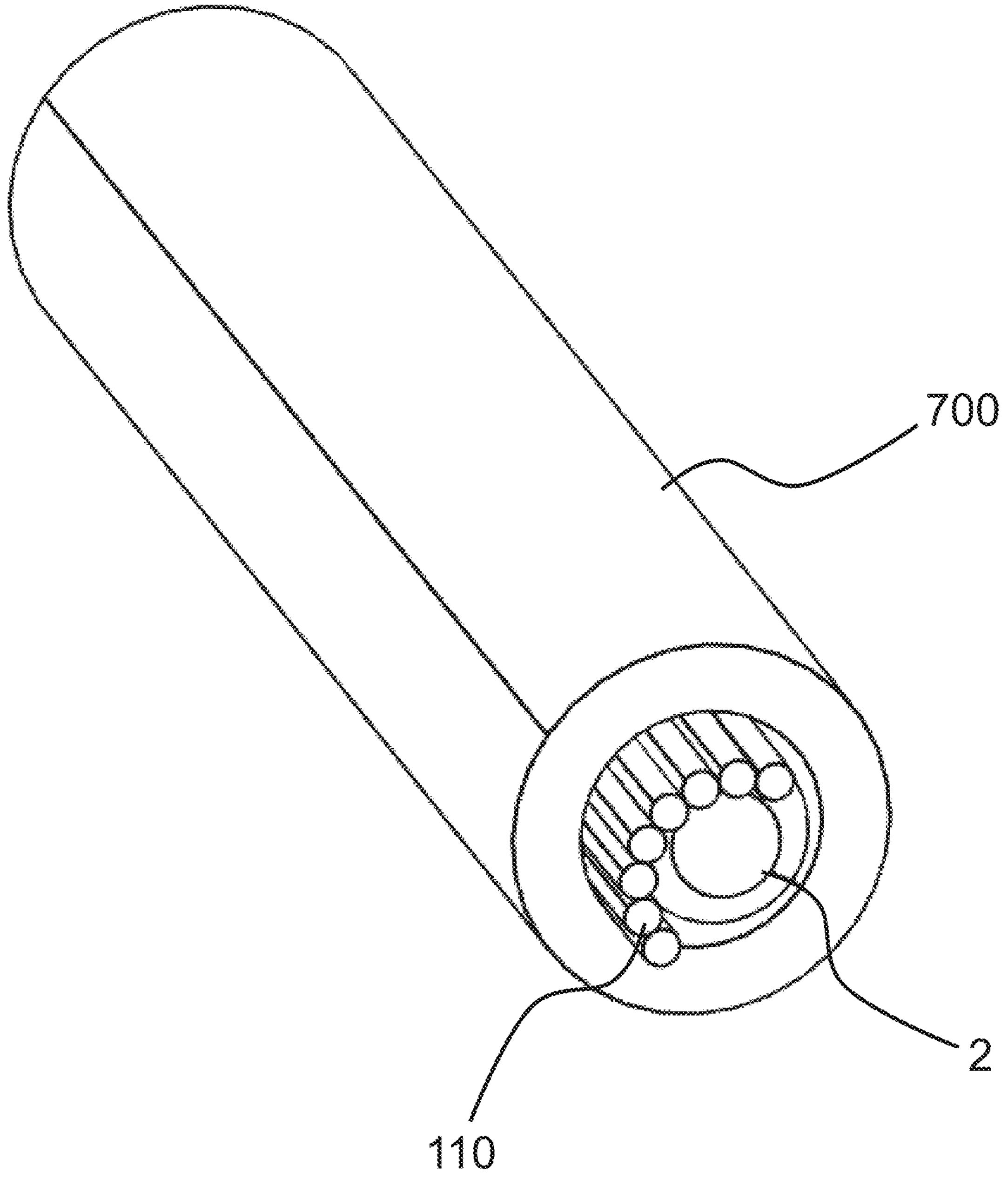
FIG. 7 is a perspective view of an illuminator, according to an embodiment.
Figure 8:
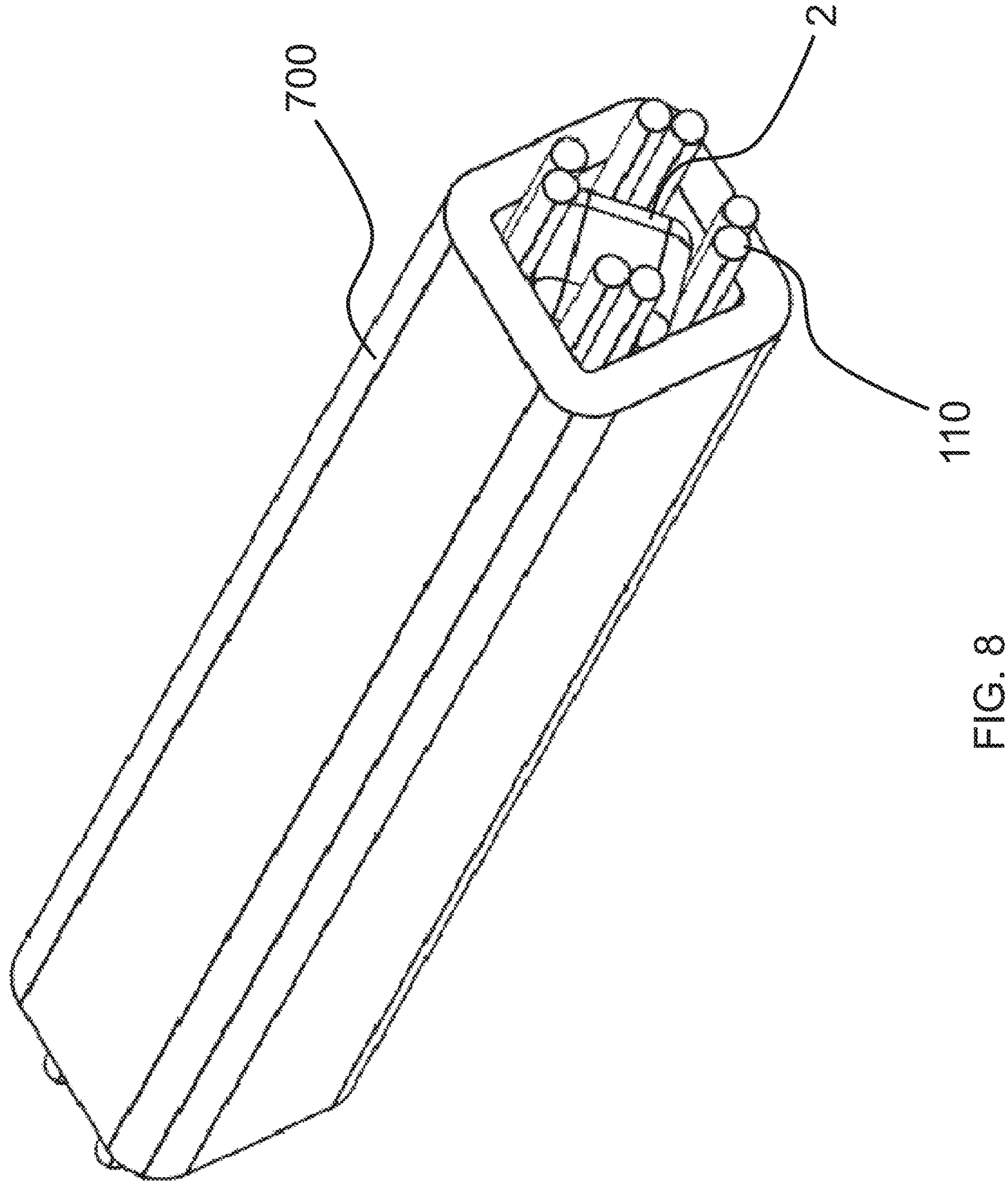
FIG. 8 is a perspective view of an illuminator, according to an embodiment.

In some embodiments of illuminator 1, an element can be added to reflect light from light source 2 back towards fiber optic filament 110. This can increase the amount of light absorbed by fiber optic filament 110. FIGS. 7 and 8 show embodiments of an illuminator 1 having a reflector 700 formed around light source 2 and fiber optic filament 110. Reflector 700 is shaped to at least partially encircle light source 2. The interior of reflector 700, or exterior in case of reflector 700 formed from a transparent material, is formed or coated with a reflective coating, for example and without limitation light colored or white paint, reflective surfaces such as polished metal or PVD coated thin layers, or glass mirror surfaces. This permits light from light source 2 that is not directly absorbed by fiber optic filament 110 to be reflected back at the fiber optic filament 110 to increase the amount of light absorbed by fiber optic filament 110, thereby increasing the brightness of the aiming point.

Figure 9:
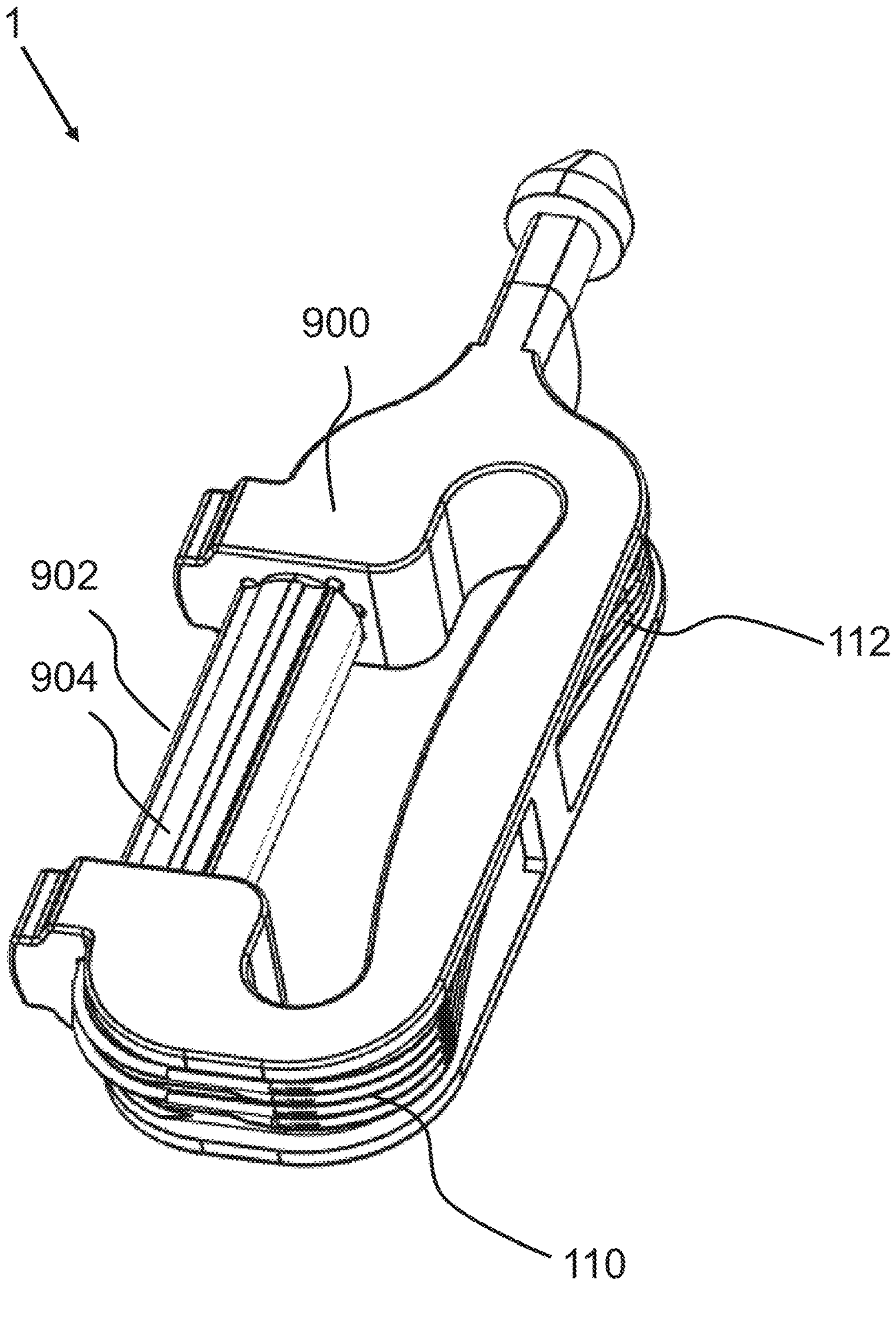
FIG. 9 is a perspective view of an illuminator, according to an embodiment.

Both FIG. 7 and FIG. 8 show embodiments of reflector 700 that surround light source 2 and fiber optic filament 110 entirely, which can be beneficial to maximize the amount of light reflection back to fiber optic filament 110. FIG. 7 shows a cylindrically shaped embodiment, while FIG. 8 illustrates a generally rectangular cross-section embodiment. Reflector 700 can be used in any embodiment of illuminator 1 by modifying the shape of reflector 700 as needed. In these embodiments, reflector 700 surrounds light source 2 directly, which makes these embodiments similar to the embodiment of FIG. 5. Reflector 700 can also be secured to a suitable portion of housing 100 through any suitable techniques, such as by mechanical fastening to protrusions on housing 100, or through the use of adhesives. In certain embodiments, reflector 700 can be shaped to reflect some or all of the light from light source 2 back to fiber optic filament 110, while permitting the fiber optic filament 110 to absorb external light. An example of this is shown in FIG. 9, which shows a housing 900 that is identical to the embodiment of FIG. 6. However, in this non-limiting example, a reflector 902 is positioned only around a light source holder 904. The remaining area of housing 900 is not covered by reflector 902, which allows for absorption of external light by the exposed fiber optic filament 110.

Figure 10:
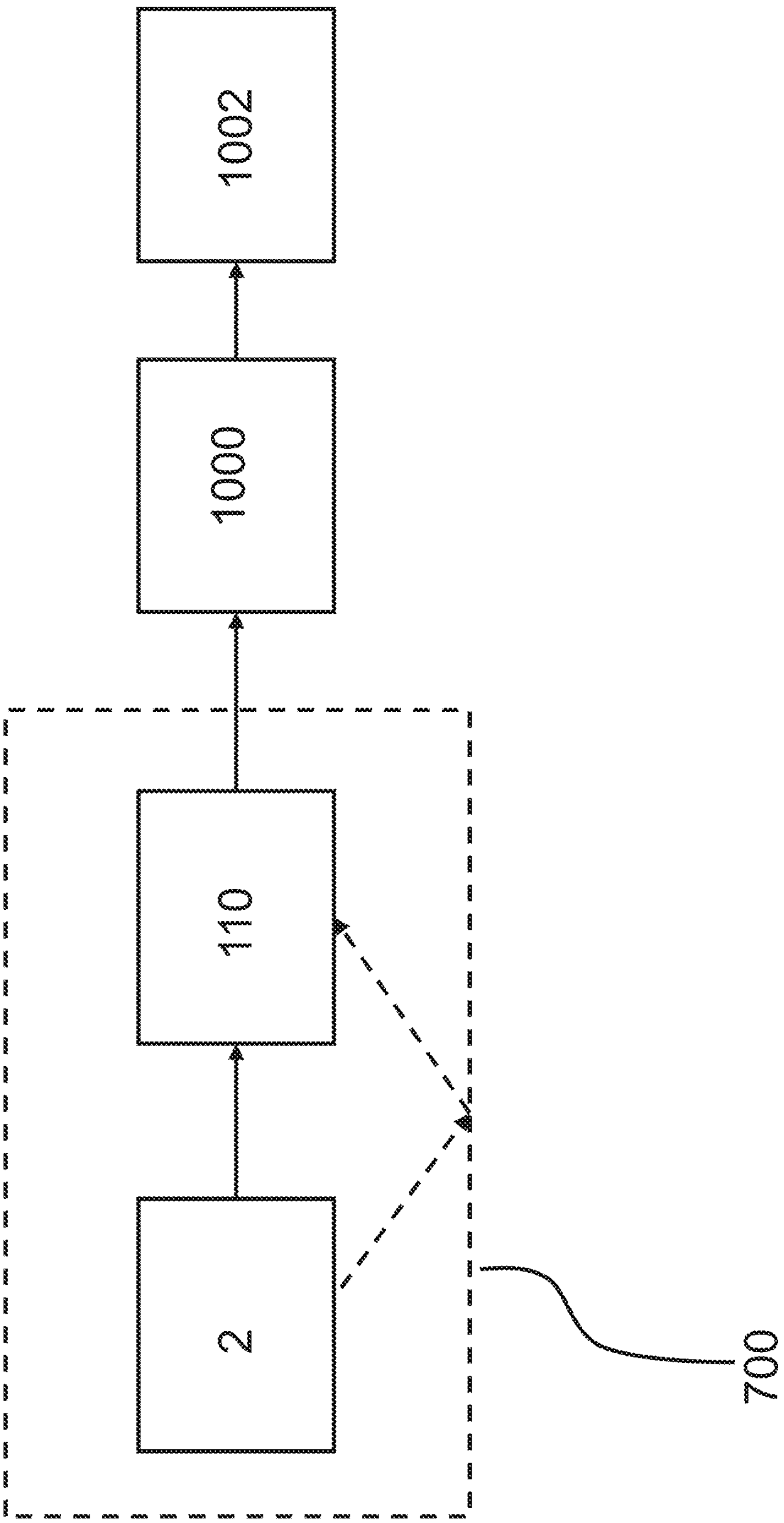
FIG. 10 is a system diagram of an optical light path in a sight, according to an embodiment.

In some embodiments, a lens 1000 is positioned to receive light emitted from the end of fiber optic filament 110. FIG. 10 is a diagram of light travel paths that shows how light can be absorbed from light source 2 by fiber optic filament 110 and then transmitted through a lens 1000 to form an aiming point 1002. Lens 1000 can function to focus light from fiber optic filament 110 to a certain point to help create aiming point 1002. In some embodiments lens 1000 collects and focuses most or substantially all of the light emitted from fiber optic filament 110. As would be understood, the position and optical characteristics of lens 1000 can vary depending on the desired size, emitting angle, and/or shape of aiming point 1002, and distance between lens 1000 and the receiving feature of aiming point 1002 (typically a prism, mirrored glass surface, or other suitable optical element). The aiming point 1002 is typically a single dot, but can have any desired shape, such as a line or symbol (e.g., ×, ○, +, •, ⁖, or the like). In some embodiments, aiming spot 1002 can range between about 0.01 millimeters and about 3 millimeters. As used here, the term lens 1000 is intended to encompass one or more lenses, prisms, mirrors, and other optical elements that can be used, alone or together, to guide, shape, or focus light being emitted from fiber optic filament 1000.

Using lens 1000 in this way provides substantial benefits to the intensity of aiming point 1002. In practice the use of fiber optic filaments 110 alone often requires a mask to create an aiming point 1002 of suitably small dimensions. The mask is an opaque surface with a hole or opening that allows a small amount of light to pass through to form aiming point 1002, thus reducing the size of the resulting aiming point 1002 but also reducing the light intensity that passes through to form aiming point 1002. This may be required because the minimum practical diameter of fiber optic filament 110 is too large to form aiming point 1002 as small as required in many situations. Lens 1000 solves this issue by using most or all of the light from fiber optic filament 110 to form a suitably dimensioned aiming point 1002. Lens 1000 can be fixed to housing 100 through any suitable structural elements. Fiber optic filament 110 can then be routed using the same structural elements such that the end of fiber optic filament 110 is optically aligned with lens 1000.

Each of the three techniques discussed above (fiber optic filament looping, reflector, and lens) can substantially increase the intensity of aiming point 1002. In some embodiments that use all three techniques, the resulting intensity can be upwards of 10, 20, 50, 100, or 200 times the intensity achieved by existing fiber optic sights. And use of the techniques individually still results in multiplicative increases in light intensity. These benefits are especially relevant for sights or other devices that use non-electric light sources 2 because these light sources tend to emit less light. Electric light sources can also benefit from designs disclosed herein because they can be made less intense, thereby conserving battery power and extending life of the light source.

In some embodiments, intensity of the light absorbed by fiber optic filament 110 can be adjusted. This can be useful in low or no light situations, such as at night, when an overly bright aiming point would cause visual difficulty in the dim environment. Certain sights are also compatible with so-called night vision devices, which operate on a light amplification principle and can allow a user improved vision in low light conditions. These devices can have difficulty with overly bright aiming points because of their light amplification properties.

Figure 11:
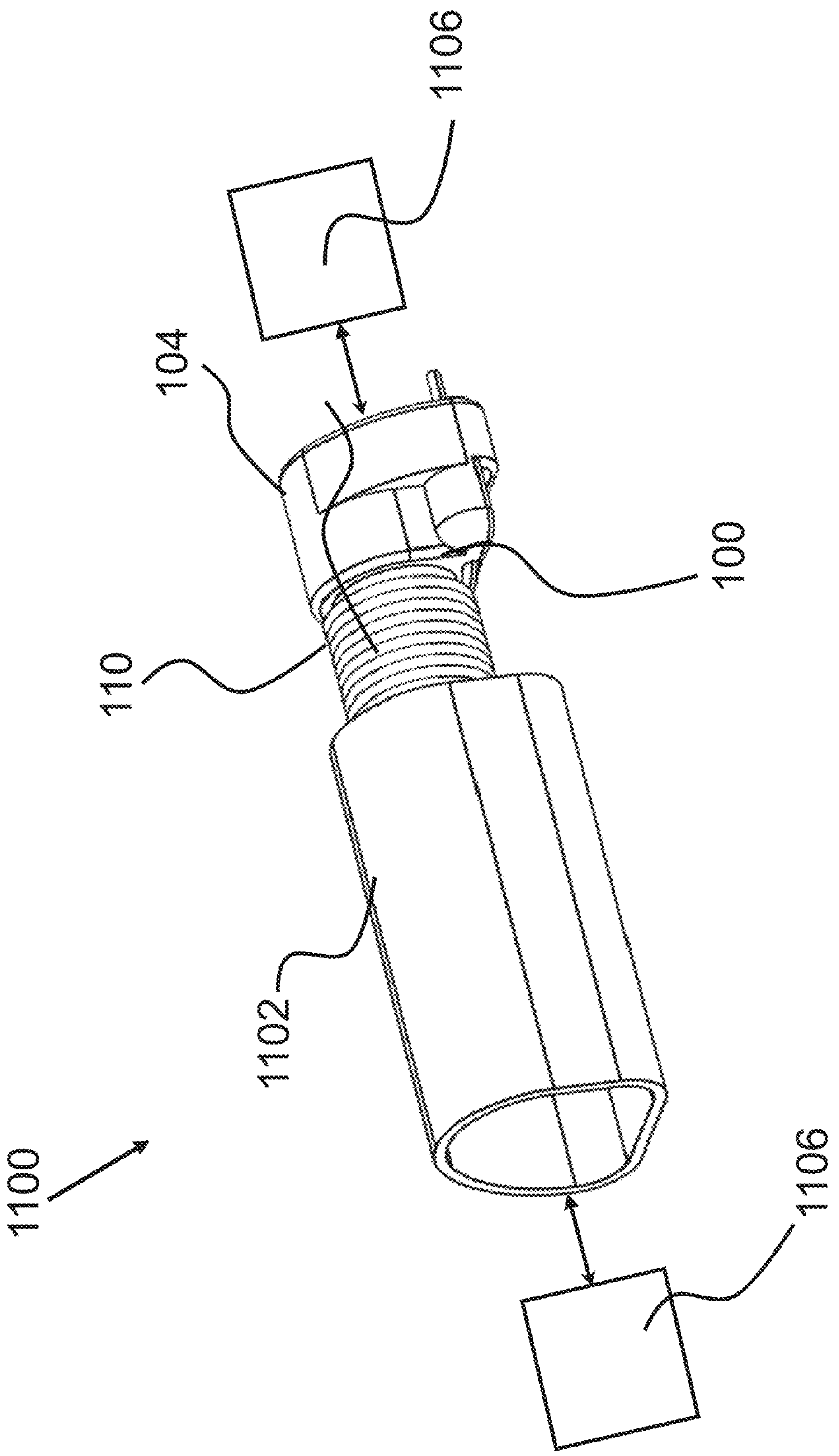
FIG. 11 is a perspective view of an illuminator, according to an embodiment.
Figure 12:
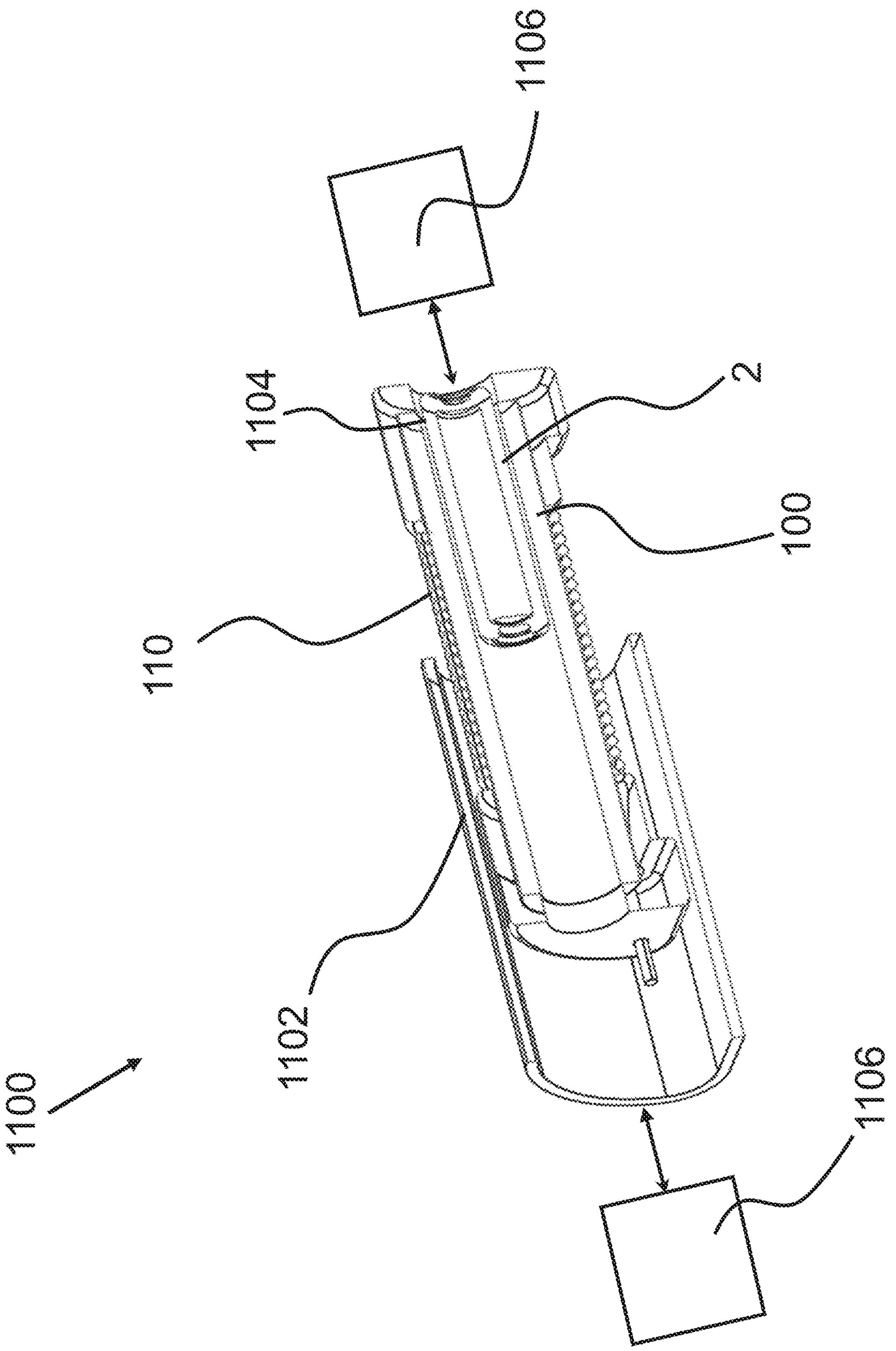
FIG. 12 is a perspective view of an illuminator, according to an embodiment.

FIGS. 11 and 12 show an embodiment of a light output adjuster 1100, which is shown applied to illuminator 1 from FIGS. 1-3. Although any illuminator 1 embodiment can include a light output adjuster 1100. Light output adjuster 1100 is formed from three main components: an external light sleeve 1102, an internal light source mount 1104, and an actuator 1106. As shown external light sleeve 1102 is a structure that can surround illuminator 1 and is mounted slidably with respect to illuminator 1. External light sleeve 1102 is opaque to the relevant light wavelengths and thus as external light sleeve 1102 slides to cover more or less of illuminator 1 the resulting external light absorbed by fiber optic filament 110 is altered.

Internal light source mount 1104 operates on a similar principal and can function as a slidable mount for light source 2 inside housing 100. Moving internal light source mount 1104 inwards and outwards with respect to housing 100 adjusts how much of light source 2 is exposed to fiber optic filament 110, which in turn adjusts the light fiber optic filament 110 absorbs from light source 2. In these embodiments, housing 100 is modified to include a portion that light source 2 can slide into that is opaque or otherwise not exposed to fiber optic filament 110. In some embodiments light source mount 1104 can be built into light source 2 itself by (as it the case in FIG. 12), for example, forming light source 2 with structural elements that have a sliding fit inside housing 100.

Actuator 1106 provides the movement needed to actuate external light sleeve 1102 and light source mount 1104. In some embodiments there can be two separate actuators 1106, as shown in FIGS. 11 and 12, with one for each of light sleeve 1102 and light source mount 1104. In some embodiments, there may be one actuator 1106 that moves both light sleeve 1102 and light source mount 1104. Actuator 1106 can be any suitable actuator that can provide the required motion and can be fixed to suitable elements in the sight. In some embodiments actuator 1106 can be a manual, non-electric actuator such as a slider lever that is moved by a user. In other embodiments actuator 1106 can be an electric actuator such as a linear actuator.

The embodiments disclosed herein may further be described using the following clauses:

1. A gun sight, comprising:

a mount configured to attach the gun sight to a gun;

a light source coupled to the mount; and one or more fiber optic filament disposed around an exterior of the light source and disposed to receive light from the light source, wherein at least a portion of the light from the light source is coupled into the fiber optic filament and exits an end of the fiber optic filament to form an alignment spot.

2. The gun sight of clause 1, wherein a reflector is disposed around the light source, the reflector surrounding at least a portion of the fiber optic filament, an interior or exterior of the reflector being configured to reflect light emitted from the light source towards the fiber optic filament, wherein a portion of the reflected light is coupled into the fiber optic filament and exits an end of the fiber optic filament to form the alignment spot.

3. The gun sight of clause 1, wherein the fiber optic filament forms a plurality of loops around the exterior of the light source, an axis of each of the loops being oriented at an angle non-parallel to an axis of the light source.

4. The gun sight of clause 1, wherein the fiber optic filament forms a helix comprising a plurality of loops of the fiber optic filament around the exterior of the light source, an axis of the helix being oriented parallel to an axis of the light source.

5. The gun sight of clause 2, wherein the reflector fully surrounds the light source such that all of the light emitted by the light source is reflected by the interior or exterior of the reflector.

6. The gun sight of clause 1, wherein the gun sight further comprises a housing, the light source being disposed in the housing, wherein the housing comprises either a transparent portion configured to allow light from the light source to pass through the housing or an opening positioned to allow light from the light source to pass through the housing, wherein the fiber optic filament is disposed around an exterior of the housing.

7. The gun sight of clause 6, wherein the housing comprises a mounting tab extending from the housing, the mounting tab configured to be received in the gun sight to secure the housing in the gun sight.

8. The gun sight of any one of clauses 1-7, further comprising a light output adjuster connected to the light source, the light output adjuster configured to move the light source with respect to the fiber optic filament to change the amount of light emitted from the light source being received by the fiber optic filament.

9. The gun sight of clause 8, wherein the light output adjuster comprises an actuator linked to a light source holder disposed in the housing, the actuator configured to move the light source holder with respect to the fiber optic filament, wherein the light source is fixed to the light source holder.

10. The gun sight of any one of clauses 1-9, wherein the light source is not electrically powered.

11. The gun sight of any one of clauses 1-10, further comprising a lens disposed to receive light emitted from the end of the fiber optic filament, the lens configured to direct the light emitted at the alignment spot.

12. A fiber optic illuminator, comprising:

a light source; and a fiber optic filament disposed around an exterior of the light source and positioned to receive light from the light source, wherein a portion of the light from the light source is coupled into the fiber optic filament and exits an end of the fiber optic filament to form an alignment spot.

13. The fiber optic illuminator of clause 12, wherein a reflector is disposed around the light source, the reflector surrounding at least a portion of the fiber optic filament, an interior or exterior of the reflector being configured to reflect light emitted from the light source towards the fiber optic filament, wherein a portion of the reflected light is coupled into the fiber optic filament and exits the end of the fiber optic filament to form the alignment spot.

14. The fiber optic illuminator of clause 12, wherein the fiber optic filament forms a plurality of loops around the exterior of the light source, an axis of each of the loops being oriented at a non-parallel angle to an axis of the light source.

15. The fiber optic illuminator of clause 12, wherein the fiber optic filament forms a helix comprising a plurality of loops around the exterior of the light source, an axis of the helix being oriented parallel to an axis of the light source.

16. The fiber optic illuminator of clause 13, wherein the reflector fully surrounds the light source such that all of the light emitted by the light source is reflected by the interior or exterior of the reflector.

17. The fiber optic illuminator of clause 12, further comprising a housing that is configured to be inserted into another device, the light source disposed inside the housing.

18. The fiber optic illuminator of clause 17, wherein the housing comprises a mounting tab extending from the housing, the mounting tab configured to be received in another device to secure the housing in the device.

19. The fiber optic illuminator of any one of clauses 12-18 further comprising a light output adjuster connected to the light source, the light output adjuster configured to move the light source with respect to the fiber optic filament to change the amount of light emitted from the light source being received by the fiber optic filament.

20. The fiber optic illuminator of clause 19, wherein the light output adjuster comprises an actuator linked to a light source holder disposed in the housing, the actuator configured to move the light source holder with respect to the fiber optic filament, wherein the light source is fixed to the light source holder.

21. The fiber optic illuminator of any one of clauses 12-20, wherein the light source is not electrically powered.

22. The fiber optic illuminator of clause 12, wherein the light source is formed with a cylindrical shape, and wherein the axis of each of the plurality of loops of the fiber optic filament is parallel to an axis of the cylindrical shape of the light source.

23. The fiber optic illuminator of clause 12, further comprising a mount configured to secure the illuminator to a device.

24. The fiber optic illuminator of any one of clauses 12-23, wherein a lens is disposed to receive light emitted from the end of the fiber optic filament, the lens configured to direct the light emitted at the alignment spot.

25. A method for transmitting light produced within a device to a desired location within and/or outside the device, the method comprising:

producing light using a gaseous tritium, self-illuminating, or self-contained powered light source disposed on or in the device;

directly receiving at least a portion of light generated by the light source;

receiving reflected light generated by the light source; and transmitting the directly received light and reflected light away from the light source to the desired location.

26. The method of clause 25, wherein the directly receiving comprising directly receiving by at least one fiber optic filament disposed at or adjacent to the light source.

27. The method of clause 26, wherein the receiving reflected light comprises receiving reflected light at the at least one fiber optic filament using a reflector.

28. The method of clause 26, wherein the at least one fiber optic filament is aligned with an axis of light source.

29. The method of clause 26, wherein the at least one fiber optic filament disposed in a helix to wrap around the light source.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way. Moreover, the examples described above do not limit the present disclosure to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The breadth and scope of the present invention should not be limited by any of the above-described exemplary embodiments, but should be defined only in accordance with the following claims and their equivalents.

What is claimed is:

1. A gun sight, comprising:

a mount configured to attach the gun sight to a gun;

a light source coupled to the mount; and a fiber optic filament disposed around an exterior of the light source and disposed to receive light from the light source, wherein at least a portion of the light from the light source is coupled into the fiber optic filament and exits an end of the fiber optic filament to form an alignment spot, and wherein the fiber optic filament forms a plurality of loops disposed to wrap around the exterior of the light source, an axis of each of the loops being oriented at an angle non-parallel to an axis of the light source.

2. The gun sight of claim 1, wherein a reflector is disposed around the light source, the reflector surrounding at least a portion of the fiber optic filament, an interior or exterior of the reflector being configured to reflect light emitted from the light source towards the fiber optic filament, wherein a portion of the reflected light is coupled into the fiber optic filament and exits an end of the fiber optic filament to form the alignment spot.

3. The gun sight of claim 2, wherein the reflector fully surrounds the light source such that all of the light emitted by the light source is reflected by the interior or exterior of the reflector.

4. The gun sight of claim 1, wherein the gun sight further comprises a housing, the light source being disposed in the housing, wherein the housing comprises either a transparent portion configured to allow light from the light source to pass through the housing or an opening positioned to allow light from the light source to pass through the housing, wherein the fiber optic filament is disposed around an exterior of the housing.

5. The gun sight of claim 4, wherein the housing comprises a mounting tab extending from the housing, the mounting tab configured to be received in the gun sight to secure the housing in the gun sight.

6. The gun sight of claim 1, further comprising a light output adjuster connected to the light source, the light output adjuster configured to move the light source with respect to the fiber optic filament to change the amount of light emitted from the light source being received by the fiber optic filament.

7. The gun sight of claim 6, wherein the light output adjuster comprises an actuator linked to a light source holder disposed in the housing, the actuator configured to move the light source holder with respect to the fiber optic filament, wherein the light source is fixed to the light source holder.

8. The gun sight of claim 1, wherein the light source is not electrically powered.

9. The gun sight of claim 1, further comprising a lens disposed to receive light emitted from the end of the fiber optic filament, the lens configured to direct the light emitted at the alignment spot.

10. A gun sight, comprising:

a mount configured to attach the gun sight to a gun;

a light source coupled to the mount; and a fiber optic filament disposed around an exterior of the light source and disposed to receive light from the light source, wherein at least a portion of the light from the light source is coupled into the fiber optic filament and exits an end of the fiber optic filament to form an alignment spot, and wherein the fiber optic filament forms a helix comprising a plurality of loops of the fiber optic filament disposed to wrap around the exterior of the light source, an axis of the helix being oriented parallel to an axis of the light source.

11. A fiber optic illuminator, comprising:

a light source configured to produce light; and a fiber optic filament configured to form a plurality of loops or passes to wrap around the light source, each of the plurality of loops or passes thereby extending in at least one of (i) a circumferential direction about a perimeter of the light source or (ii) a longitudinal direction along a length of the light source, such that at least a portion of the light is coupled into the fiber optic filament and transmitted to exit an end of the fiber optic filament thereby forming a desired illumination.

12. The fiber optic illuminator of claim 11, wherein a reflector is disposed adjacent to or around the light source and/or at least a portion of the fiber optic filament, wherein an interior or exterior of the reflector is configured to reflect the light emitted from the light source towards the fiber optic filament, wherein a portion of the reflected light is also coupled into the fiber optic filament and exits the end of the fiber optic filament.

13. The fiber optic illuminator of claim 12, wherein the reflector fully surrounds the light source such that all of the light emitted by the light source is reflected by the interior or exterior of the reflector.

14. The fiber optic illuminator of claim 11, wherein an axis of each of the loops or passes is oriented at a non-parallel angle to an axis of the light source.

15. The fiber optic illuminator of claim 11, wherein the light source comprises a gaseous tritium, self-illuminating, or self-contained powered light source.

16. The fiber optic illuminator of claim 11, wherein a lens is disposed to receive light emitted from the end of the fiber optic filament.

17. The fiber optic illuminator of claim 11, wherein the light source comprises a long axis, and wherein an axis of each of the plurality of loops or passes of the fiber optic filament is parallel to the long axis of the light source.

18. The fiber optic illuminator of claim 11, further comprising a housing that is configured to be inserted into another device, the light source disposed inside the housing.

19. The fiber optic illuminator of claim 11, further comprising a light output adjuster configured to move the light source with respect to the fiber optic filament to change the amount of light emitted from the light source being received by the fiber optic filament.

* * * * *